United States Patent
Tsou et al.

(10) Patent No.: US 12,455,914 B2
(45) Date of Patent: **\*Oct. 28, 2025**

(54) DYNAMIC AGENDA ITEM COVERAGE PREDICTION

(71) Applicant: Zoom Communications, Inc., San Jose, CA (US)

(72) Inventors: Ling Tsou, Los Angeles, CA (US); Tong Wang, Lexington, MA (US); Yun Zhang, Pittsburgh, PA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/945,173

(22) Filed: Nov. 12, 2024

(65) Prior Publication Data

US 2025/0068670 A1    Feb. 27, 2025

Related U.S. Application Data

(63) Continuation of application No. 17/978,072, filed on Oct. 31, 2022, now Pat. No. 12,174,873.

(51) Int. Cl.

| | | |
|---|---|---|
| *G06F 16/353* | (2025.01) | |
| *G06F 16/383* | (2019.01) | |
| *G06F 40/284* | (2020.01) | |
| *H04L 12/18* | (2006.01) | |

(52) U.S. Cl.
CPC .......... *G06F 16/353* (2019.01); *G06F 16/383* (2019.01); *G06F 40/284* (2020.01); *H04L 12/1831* (2013.01)

(58) Field of Classification Search
CPC .... G06F 16/242; G06F 16/22; G06F 16/2474; G06F 16/287

See application file for complete search history.

(56) References Cited

U.S. PATENT DOCUMENTS

| | | |
|---|---|---|
| 7,298,930 B1 | 11/2007 | Erol et al. |
| 8,214,242 B2 | 7/2012 | Agapi et al. |
| 9,269,073 B2 | 2/2016 | Sammon et al. |
| 10,535,352 B2 | 1/2020 | Pankanti et al. |
| 11,095,468 B1 | 8/2021 | Pandey et al. |
| 11,120,798 B2 | 9/2021 | Bar-on et al. |
| 11,216,787 B1 | 1/2022 | Shetty |
| 11,349,679 B1 | 5/2022 | Laird-McConnell et al. |

(Continued)

OTHER PUBLICATIONS

International Search Report and Written Opinion mailed on Jan. 30, 2024 in corresponding PCT Application No. PCT/US2023/034726.

*Primary Examiner* — Jorge A Casanova

(74) *Attorney, Agent, or Firm* — Young Basile Hanlon & MacFarlane, P.C.

(57) ABSTRACT

Methods and systems provide for dynamic prediction of agenda item coverage in a communication session. In one embodiment, the system classifies each agenda item as a long item or a short item; for agenda items classified as long items, extracts one or more topics from the utterances, and uses a topic detection model to predict whether a topic related to each agenda item classified as a long item has been covered; for agenda items classified as short items, applies one or more matching methods to predict whether one or more of the utterances within the sentence threshold cover each agenda item classified as a short item; and transmits, to one or more client devices, a status of the agenda items for the communication session.

20 Claims, 8 Drawing Sheets

(56) References Cited

U.S. PATENT DOCUMENTS

| | | | |
|---|---|---|---|
| 11,429,933 | B2 | 8/2022 | Fox et al. |
| 11,558,438 | B1 | 1/2023 | Lu et al. |
| 11,741,298 | B1 | 8/2023 | Polavaram |
| 2007/0150583 | A1 | 6/2007 | Asthana et al. |
| 2008/0221893 | A1 | 9/2008 | Kaiser |
| 2009/0070678 | A1 | 3/2009 | Landar et al. |
| 2009/0099983 | A1 | 4/2009 | Drane et al. |
| 2010/0153875 | A1 | 6/2010 | O'Flynn et al. |
| 2011/0153482 | A1 | 6/2011 | Conigliaro et al. |
| 2012/0290950 | A1 | 11/2012 | Rapaport et al. |
| 2013/0179455 | A1 | 7/2013 | Herger et al. |
| 2014/0082100 | A1 | 3/2014 | Sammon et al. |
| 2014/0164510 | A1 | 6/2014 | Abuelsaad et al. |
| 2016/0358126 | A1 | 12/2016 | Bostick et al. |
| 2017/0316383 | A1 | 11/2017 | Naganathan et al. |
| 2017/0353605 | A1 | 12/2017 | Dumaine et al. |
| 2018/0152539 | A1 | 5/2018 | Bastide et al. |
| 2019/0074987 | A1 | 3/2019 | Wiener et al. |
| 2019/0384854 | A1 | 12/2019 | Mahmoud |
| 2020/0050998 | A1 | 2/2020 | Bastide et al. |
| 2020/0073934 | A1 | 3/2020 | Brunn et al. |
| 2020/0153776 | A1 | 5/2020 | Qiu et al. |
| 2020/0372475 | A1 | 11/2020 | Bastide et al. |
| 2020/0410997 | A1 | 12/2020 | Bar-on et al. |
| 2021/0073743 | A1 | 3/2021 | Fox et al. |
| 2021/0117929 | A1 | 4/2021 | Lewbel et al. |
| 2021/0390144 | A1 | 12/2021 | B M S et al. |
| 2022/0157301 | A1 | 5/2022 | O'Connor et al. |
| 2023/0230586 | A1 | 7/2023 | Giovanardi et al. |
| 2023/0244874 | A1 | 8/2023 | Shi et al. |
| 2023/0326454 | A1 | 10/2023 | Miller-Smith et al. |
| 2023/0353407 | A1 | 11/2023 | Giovanardi et al. |
| 2024/0126991 | A1 | 4/2024 | Epstein Koch et al. |

Agenda: Happy crew leadership update

> Click here to expand...

Hey, guys. Yeah, really excited to chat with you today. uh, You know what an all hands. A few months ago, we talked about uh, opening up nominations for new happy crew leadership. uh, Globally, for the happy crew really excited to announce we've had some amazing nominations and a lot of new faces come into the happy crew leadership team. So you can go to the next slide. For 2020 all these yellow stars are our new awesome leaders that will be helping us globally. So we've added a co Captain role. uh, That person is going to be grooming themselves to take over the happy crew next year. uh, Neil and HQ. uh, He's done some amazing things helping with Zoomtopia and came highly recommended by the HQ happy crew team. We're so excited to have him aboard. Welcome, Neil. Our new treasure Dean comes with a background in working with budgets and finances and things like that. So he was a perfect fit managing our very large and uh, quite complex budget globally so really excited to have him. uh, Carly out of Santa Barbara is our new events Steward.

FIG. 4

| Sentence | Short Agenda Item | Type |
|---|---|---|
| Rep: You can have up to 10 pre loaded questions. | Mention the number of preloaded questions | Single sentence match |
| ... | ... | |
| Rep: And like I said, I think that we should set up a meeting with her. | Mention schedule a meeting with Jessica | Two sentence/Window match |
| Rep: Her name is Jessica. | Mention schedule a meeting with Jessica | |
| ... | ... | |

FIG. 5

DYNAMIC AGENDA ITEM COVERAGE PREDICTION

CROSS-REFERENCE TO RELATED APPLICATION(S)

This application is a continuation of U.S. patent application Ser. No. 17/978,072, filed Month Oct. 31, 2022, the entire disclosure of which is hereby incorporated by reference.

FIELD OF INVENTION

The present invention relates generally to digital communication, and more particularly, to systems and methods for providing dynamic prediction of agenda item coverage in a communication session.

SUMMARY

The appended claims may serve as a summary of this application.

BRIEF DESCRIPTION OF THE DRAWINGS

The present invention relates generally to digital communication, and more particularly, to systems and methods for providing dynamic prediction of agenda item coverage in a communication session.

The present disclosure will become better understood from the detailed description and the drawings, wherein:

FIG. 4 is a diagram illustrating an exemplary agenda item classified as a long item and a corresponding section of a transcript, in accordance with some embodiments.

FIG. 5 is a diagram illustrating exemplary agenda items classified as short items and corresponding sentences within a transcript, in accordance with some embodiments.

DETAILED DESCRIPTION

Figure 1A:
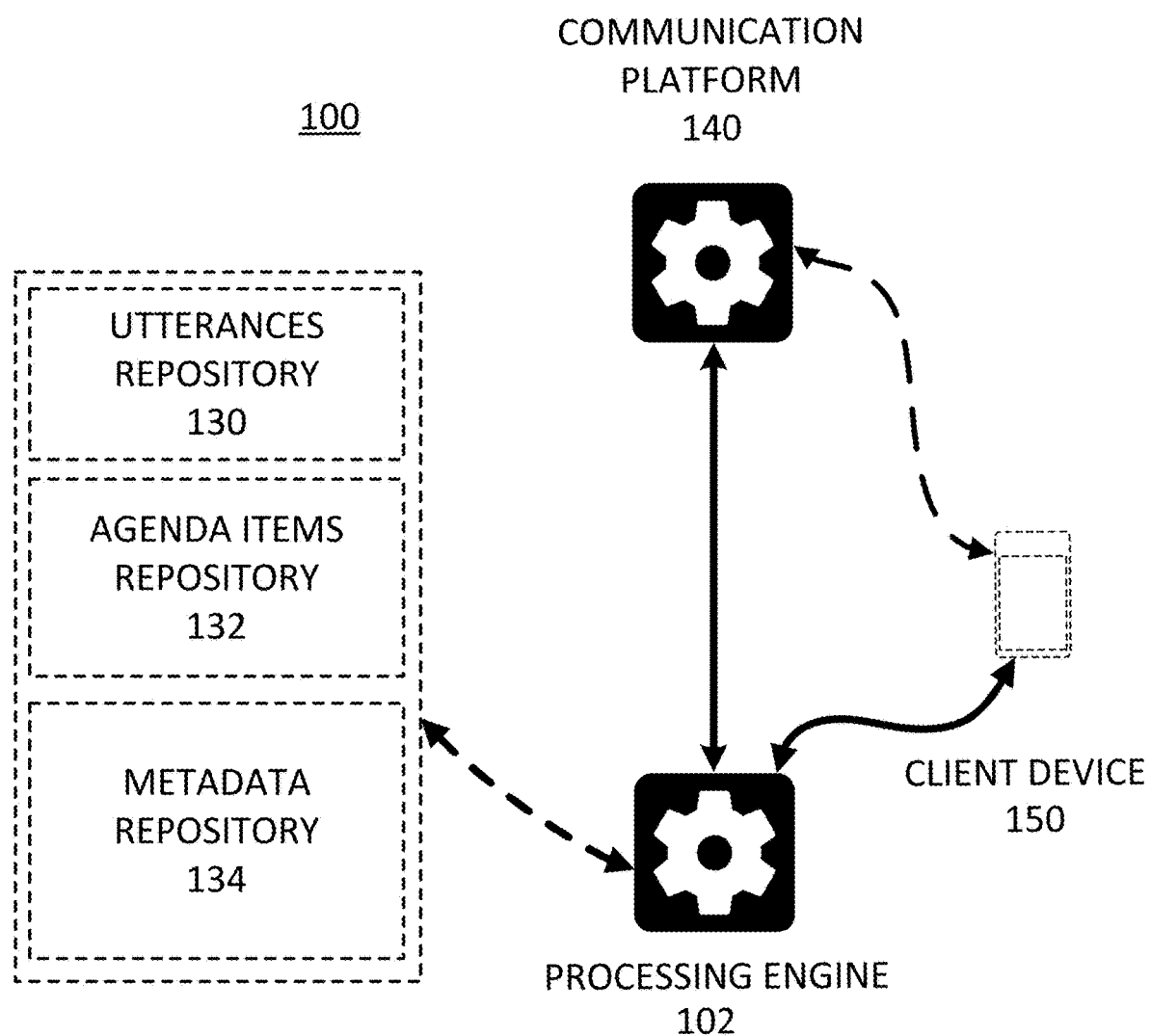
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

When navigating through recorded video of a communication session, reviewing a sales meeting can be difficult and time consuming, as sales meetings can often run for 30-60 minutes, and a large amount of time is often spent on scrolling through the meeting to find the portion or topic the user is looking for. Additionally, past sales meetings can be difficult to search for, as there is no way to search for specific topics of discussion for specific prospective customers.

In particular, sales teams may have an agenda with a list of items to cover during a meeting with a prospective customer. In order to ascertain whether the items were covered or not during the meeting, one or more members of the team would have to review the meeting content and decide whether the items had been covered or not. Not only would this be a post-meeting process, but it would take up time and energy of the sales team. Alternatively, the team members may attempt to remember whether items have been covered or not, which may be subject to human fallibility and misremembering. Additionally, when checking for agenda items is performed manually, there is the possibility for a team member marking an item as covered when it has not been covered, for various reasons.

Thus, there is a need in the field of digital communication tools and platforms to create a new and useful system and method for providing dynamic prediction of agenda item coverage in a communication session, particularly based on a number of utterances and a list of agenda items. The source of the problem, as discovered by the inventors, is a lack of ability to dynamically predict whether agenda items have been covered automatically and in real time during a meeting.

In one embodiment, the system connects to a communication session with a plurality of participants; receives one or more agenda items for the communication session; receives a number of utterances from participants produced during the communication session; classifies each agenda item as a long item or a short item, a short item being covered within a specified sentence threshold; for agenda items classified as long items, extracts one or more topics from the utterances, and uses a topic detection model to predict whether a topic related to each agenda item classified as a long item has been covered; for agenda items classified as short items, applies one or more matching methods to predict whether one or more of the utterances within the sentence threshold cover each agenda item classified as a short item; and transmits, to one or more client devices, a status of the agenda items for the communication session.

A meeting, such as a communication session facilitated via a remote communication platform, typically contains several topics and several utterances spoken by participants. A system for dynamic prediction of agenda item coverage, in accordance with some embodiments, functions to take in a list of agenda items and a number of utterances as inputs, classify the agenda items as long items or short items, and then using different methods for long items and short items to predict whether those items have been covered in the topics and/or utterances within the session.

In some embodiments, inputs for the system include at least a number of utterances with timing and speaker information, and a submitted list of agenda items which may be relevant to the agenda or goals of the meeting and/or participants. In some embodiments, at least one output for the system includes a status of the long and short agenda items.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an utterances repository 130, an agenda items repository 132, and/or a metadata repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
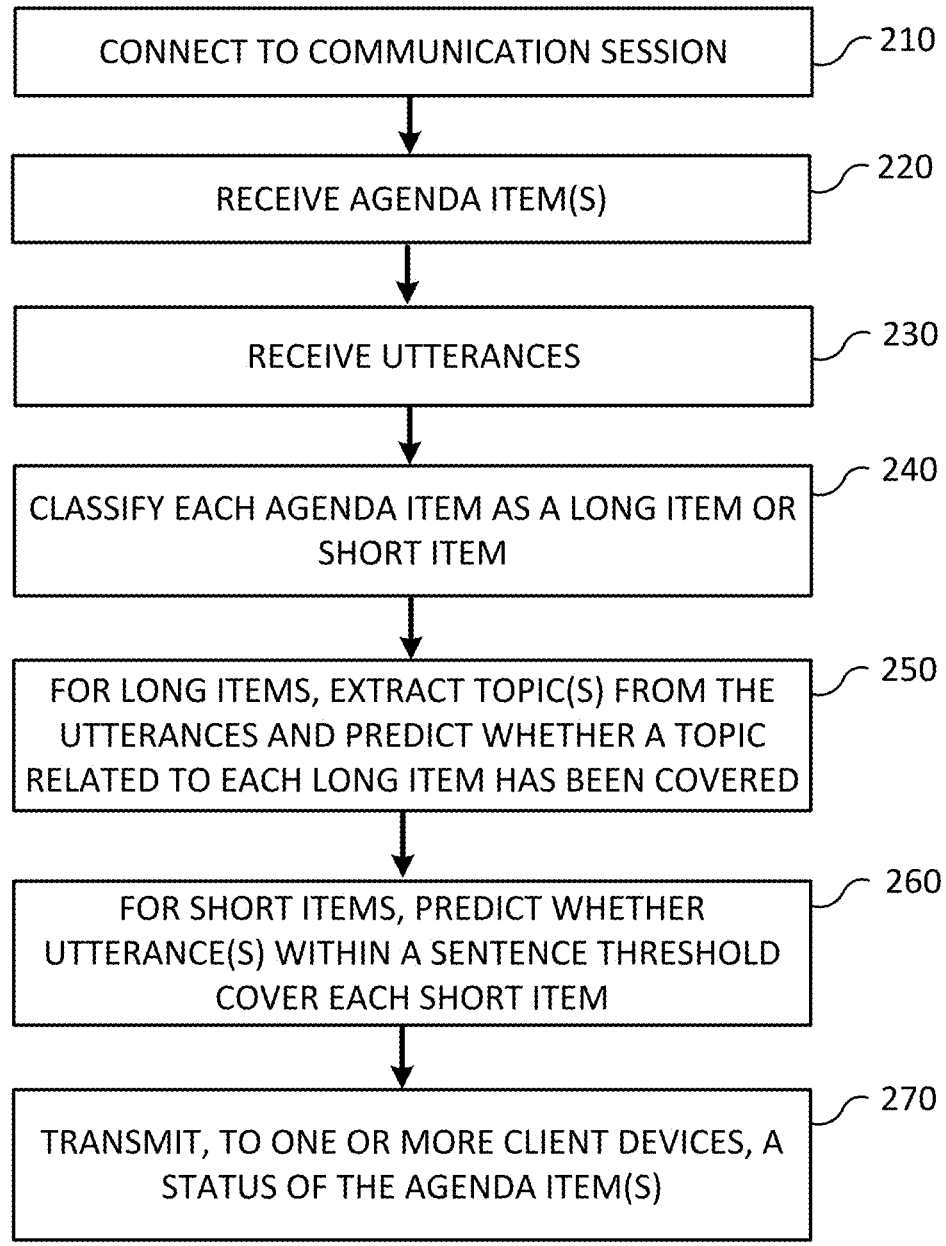
FIG. 2 is a flow chart illustrating an exemplary method that may be performed in some embodiments.

In an embodiment, the processing engine 102 may perform the exemplary method of FIG. 2 or other method herein and, as a result, provide dynamic prediction of agenda item coverage in a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an utterances repository 130, agenda item repository 132, and/or metadata repository 134. The optional repositories function to store and/or maintain, respectively, utterances for the communication session; submitted agenda items for the communication session and their coverage status; and metadata related to the communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
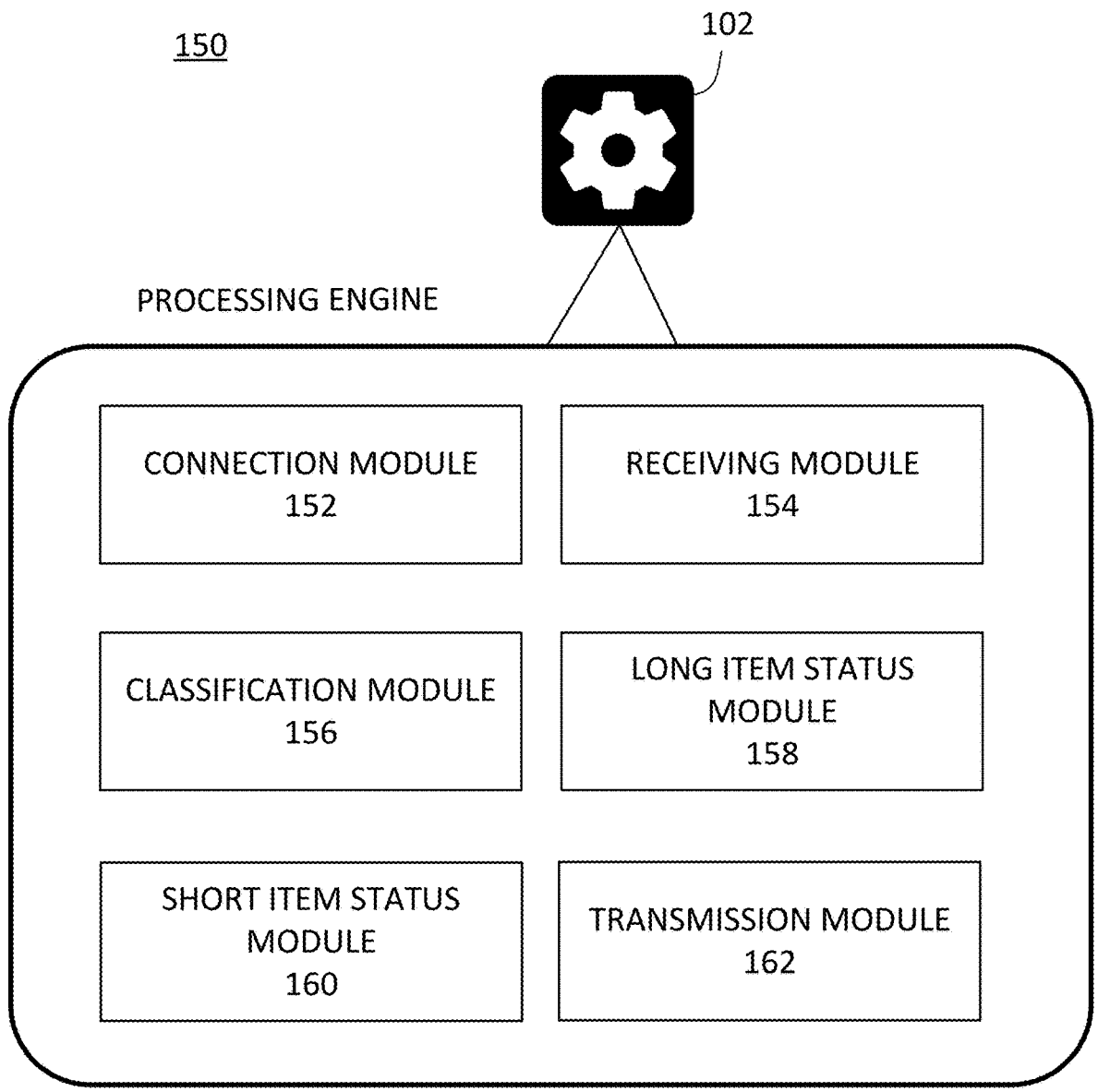
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants.

Receiving module 154 functions to receive one or more agenda items and a number of utterances from participants produced during the communication session Classification module 156 functions to classify each agenda item as a long item or a short item.

Long item status module 158 functions to extract one or more topics from the utterances and use a topic detection model to predict whether a topic related to each long item has been covered.

Short item status module 160 functions to apply one or more matching methods to predict whether one or more of the utterances within the sentence threshold cover each short item.

Transmission module 162 functions to transmit, to one or more client devices, a status of the agenda items for the communication session.

The above modules and their functions will be described in further detail in relation to an exemplary method below.

FIG. 2A is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives one or more agenda items. In some embodiments, the system receives the agenda item(s) from a client device associated with an authorized user. An authorized user may be, e.g., a participant of the communication session, an account administrator, a host of the communication session, an administrator or authorized representative of an entity or organization, or any other suitable authorized user. In some embodiments, authorization can be based on permission being granted to a user with some authority over at least a subset of the participants of the communication session who may have access to, e.g., the communication session, analytics data or recordings related to the session, or any other suitable data related to the communication session.

In some embodiments, the agenda items may be a predefined list of agenda items. The agenda items may be, e.g., words, phrases, alphanumeric characters, or any other suitable string or series of characters.

Agenda items can be considered to be a list of tasks, actions, or conditions to be fulfilled during the course of the meeting in order for the item to be deemed "covered". An agenda item can be determined to be "covered" when the particular task, action, or condition is completed, carried out, or fulfilled. For example, one agenda item may be "mention the amount of money the company can match for the care program". In order for the agenda item to be deemed "covered" by the system, in one scenario, the system may have to determine that one of the participants within a subset of the participants of the communication session (e.g., a sales team present at the meeting) has discussed the amount of money able to be matched by the company for the care program. Many other such scenarios and possibilities may exist for agenda items and what they may constitute.

At step 230, the system receives a number of utterances from participants produced during the communication session. That is, the conversation which was produced during the communication is used to generate utterances which are received in real time during the communication session. The utterances are either generated by the system, or is generated elsewhere and retrieved by the system for use in the present systems and methods. In some embodiments, the utterances are textual in nature. In some embodiments, the utterances are composed of one or more sentences attached to a specific speaker of that sentence (i.e., participant). Timestamps may be attached to each utterance and/or each sentence. In some embodiments, the utterances are generated in real-time while the communication session is underway, and a transcript of utterances is presented after the meeting has terminated. In other embodiments, the utterances are generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the utterances or transcript. In some embodiments, natural language processing ("NLP") techniques may be used in whole or in part to generate the utterances or transcript.

In some embodiments, a transcript may be received in real time while the transcript is still being generated. For example, the transcript may still be in the process of being generated as the communication session is underway, with utterances spoken by the participants being added to the transcript in real time. The transcript may also be continually received as this process occurs, such that the system periodically receives updates to the transcript while the meeting is occurring. In such instances, the system can be enabled to perform various steps relating to FIG. 2 in real time while the meeting is underway.

In some embodiments, the system additionally receives metadata for the communication session. This metadata can be used for the prediction of agenda item coverage status. For example, the system may receive metadata relating to the participants of the communication session. Such metadata may be, e.g., user account information associated with one or more participants on the communication platform associated with the session, user preferences associated with one or more participants, job titles or associated departments of one or more participants, type of meeting, or any other suitable or relevant metadata.

In some embodiments, the system additionally receives video output frames for the communication session. The video output frames can be used for the prediction of agenda item coverage status. For example, as a meeting is underway, the system may receive video output from one or more video streams of participants present in the communication session. In some embodiments, these video output frames may be analyzed or processed to extract features or characteristics related to or relevant to the prediction of agenda item coverage status. For example, even though the utterances may not be related to a particular agenda item, the agenda item may be adequately covered in a presentation slide which has appeared while a participant is presenting during the meeting. In such a scenario, the system may be configured to process frames containing the presentation slide to make a prediction that the agenda item has been covered.

In some embodiments, the system additionally receives a list of topic items for the communication session. In such embodiments, the system may make use of this received list of topic items rather than extracting topics in step 250, as will be discussed below.

At step 240, the system classifies each agenda item as a long item or a short item. In some embodiments, an agenda item can be manually defined by a user as a long item or a short item, in which case the system classifies the agenda item according to the user definition. In some embodiments, an agenda item is automatically classified as a long item or a short item. A short agenda item may be defined as an agenda item which may be adequately covered within a specified sentence threshold, such as, e.g., within one sentence or two sentences. In some embodiments, the sentence threshold may be specified for all meetings or a subset of meetings associated with, e.g., one or more participants, user accounts, hosts, administrators, or companies associated with user accounts. In some embodiments, the sentence threshold may be specified by the system itself, such as in a default system setting of, e.g., two sentences for a short agenda item. Examples of short agenda items may be to, e.g., obtain a phone number, schedule a follow-up meeting, or complete a self-introduction. Additional examples of agenda items classified as short items in some embodiments are illustrated in FIG. 5 and its accompanying descriptions.

A long agenda item, in contrast to a short agenda item, may be defined as an agenda item which can be adequately covered only beyond the bounds of the specified sentence threshold. For example, if the specified sentence threshold is two sentences, then a long item may be classified as any agenda item which would require a participant to speak more than two sentences to fulfill the conditions of the agenda item such that it may be deemed by the system to be covered. Examples of long agenda items may be to, e.g., complete a demonstration of a product, or to discuss licensing and pricing tiers for a product. In some examples, a long item will cover five sentences or more (where the specified sentence threshold is five sentences). In some embodiments, an agenda item may additionally be classified as a long agenda item only if a particular topic is determined by the system to have been discussed. The relationship of topics discussed to long agenda items will be further discussed below.

At step 250, for agenda items classified as long items, the system first (1) extracts one or more topics from the utterances, then (2) uses a topic detection model to predict whether a topic related to each long item has been covered.

In some scenarios, topics may include, for example, "Customer Info", "Product", "Demo", "Pricing/License", "Account", and "General Discussion". A topic may be, for example, a product or service name, brand or company name, industry terms of art, or any other word or phrase which may be part of a list of topics covered during the course of a particular meeting.

In some embodiments, extracting the one or more topics from the utterances for long items includes a preprocessing step to extract key phrases from the agenda items. In some embodiments, the agenda items may contain free form text. The preprocessing step functions to use the most relevant part of this free form text for topic detection purposes, particularly for long items. In some embodiments, the preprocessing step includes running spacy Named Entity Recognition ("NER") to detect people and organizations within the text of agenda items. For example, if the detected NER entity is at the end of an agenda text and preceded by "with", (e.g., "discuss company healthcare with Mayo Clinic"), the system removes the part from "with" on in order to obtain the first part ("discuss company healthcare"). In some embodiments, the replacement is performed by regex match to add additional flexibility. In some embodiments, the preprocessing step includes removing the first verb of agenda item text that is not part of the topic, such as, e.g., "discuss", "cover", or "introduce", since they are not part of the main topic.

In some embodiments, the preprocessing step includes key phrase extraction. In some embodiments, KeyBert or similar methods may be used for extracting key phrases. In some embodiments, this enables the system to obtain key words which may be used by an explicit mention model, described further below.

An example of preprocessing output is as follows: for the agenda item text, "Share account and license information with the University of Pittsburgh", the topic "account and license information" may be extracted, since the first verb, "share", is removed, as well as all words from "with" to the end of the text. The key phrases extracted are "account" and "license information".

In some embodiments, extracting the one or more topics from the utterances is performed via a sliding window method. In some embodiments, the sliding window method includes: (1) shifting a window over the utterances one word at a time with a pre-specified window size to generate two blocks of utterances per each shift of the window; (2) at each shift of the window, comparing the two blocks of the utterances to determine whether the blocks are semantically similar; and (3) defining a boundary between two topics when two blocks of utterances are semantically different.

In some embodiments, the topic detection model used to predict long agenda item coverage includes zero shot topic detection techniques. In some embodiments, the prediction of agenda item coverage is to be performed in real time during a meeting, so rather than using segments for prediction, a sliding window method is used for prediction, as described above.

The goal of zero-shot topic classification is to make use of a pre-trained model within any additional fine-tuning being needed on a task-specific corpus. In some embodiments, natural language inference ("NLI") is employed to accomplish this, using a zero-shot framework. NLI, sometimes called "text entailment", involves the task of determining whether a "hypothesis" is true (i.e., entailment), false (i.e., contradiction), or undetermined (i.e., neutral), given a "premise". The (premise, hypothesis) pairs may be fed into a cross-encoder configured to learn how to predict one of the three labels. In some embodiments, a simple method for performing this zero-shot text classification is to feed in the sequence to be classified as a "premise", along with the "hypothesis" that the text is about the topic. For example, if the utterance is, "how much would it be for both of those products?" and we want to know if this utterance is relating to the topic "pricing", then the system can feed in the premise-hypothesis pair:

premise="How much would it be for both of those products?
hypothesis="This text is about pricing."

In some embodiments, the hypothesis used by the model may be, e.g., "they are talking about $TOPIC", where $TOPIC is a key phrase obtained during the preprocessing step described above.

In some embodiments, a probability estimate of the hypothesis being true can be obtained by removing the neutral score, and feeding the contradiction and entailment scores to a SoftMax. In some embodiments, since each utterance can belong to multiple topic labels, each of the topics are handled separately and independently, and at least a subset of the topics may (but not necessarily will) overlap with one or more of the other topics. In other words, for each (utterance, topic) pair, the system determines whether the utterance is a part of the discussion that is about the topic. In some embodiments, the system feeds the sliding window text into the classifier, as well as each of the topics, and determines whether the text sequence is about the topic. In some embodiments, the system concatenates the utterances within each sliding window text, then applies a zero-shot topic classifier to every (sliding window text, topic) pair.

In some embodiments, the topic detection model used to predict long agenda item coverage includes explicit mention match techniques. Explicit mention techniques can be effective indicators for predicting a topic has been discussed. In some embodiments, the key phrases extracted during the preprocessing step described above are used to match the sliding window text, and a final score is calculated to be added to the zero-shot prediction for final threshold cutting. In some embodiments, the system matches each lemmatized key phrase against the lemmatized candidate sequences. In some embodiments, one or more of the following assumptions are made by the system: (1) if more key phrases are matched, the system is more likely to determine that the text is relevant to a topic; (2) for an n-gram key phrase, phrase exact matches are more helpful than individual matches of the unigrams of the key phrase; and (3) text with multiple mentions of the key phrases is more relevant to a specific topic. In some embodiments, in order to achieve this, the system implements the heuristics as one of more of: (1) for each unigram key phrase, the system assigns score 1 for finding a match in the sequence, then multiplies score 1 with the number of matches; (2) for each n gram key phrase match, the system masks the matched text and attempts to match individual tokens in the target text block. Every time the system finds each unigram in the phrase matched, the system adds 1.0 to the split match score. The system then combines each match score with the split match score to form n-gram scores; and (3) the unigram score and n-gram scores are combined together to form a final score, if it exceeds the predefined threshold, the system predicts that a long agenda item has been covered.

In some embodiments, the topic detection model includes one or more real time inference techniques. For real-time inference, the system feeds in the sliding window text (the current utterance with previous utterances) to the topic zero shot model and the explicit mention detector, then combines the scores and compares them with the predefined threshold for making a final prediction. In some embodiments, for each window, the system only chooses the one with the highest score, in order to treat the task as a single label prediction problem. Additionally, in some embodiments, if the scores of the top two labels are both high and close to each other (i.e., below a certain differential threshold), the system does not select any label and instead relies on other sliding windows for prediction. An example of a "true positive" prediction of a long agenda item being covered is illustrated in FIG. 4.

In some embodiments, for long agenda items, the system runs the explicit mention match before running the zero-shot topic detection model. If the system finds a match with the explicit mention heuristics, then the system skips the zero shot model. If the system finds no match with the explicit mention heuristics, then the results will only be decided by zero shot matching results.

At step 260, for agenda items classified as short items, the system applies one or more matching methods to predict whether one or more of the utterances within the sentence threshold cover each short item. Short agenda items are generally used for the purpose of reminding participants to ask specific questions or mention quick notes. In various embodiments, short agenda items may have one or more of the following characteristics: (1) they may cover only a few utterances or sentences, e.g., less than 5 sentences; (2) the question or note may be explicit (e.g., "mention the number of preloaded questions") or implicit (e.g., "ask about the work model"). In some embodiments, the system determines a short item to be covered if only one sentence or utterance matches.

In some embodiments, the matching method(s) can include one or more of: sentence similarity match techniques, window similarity match techniques, and word match techniques.

Figure 6:
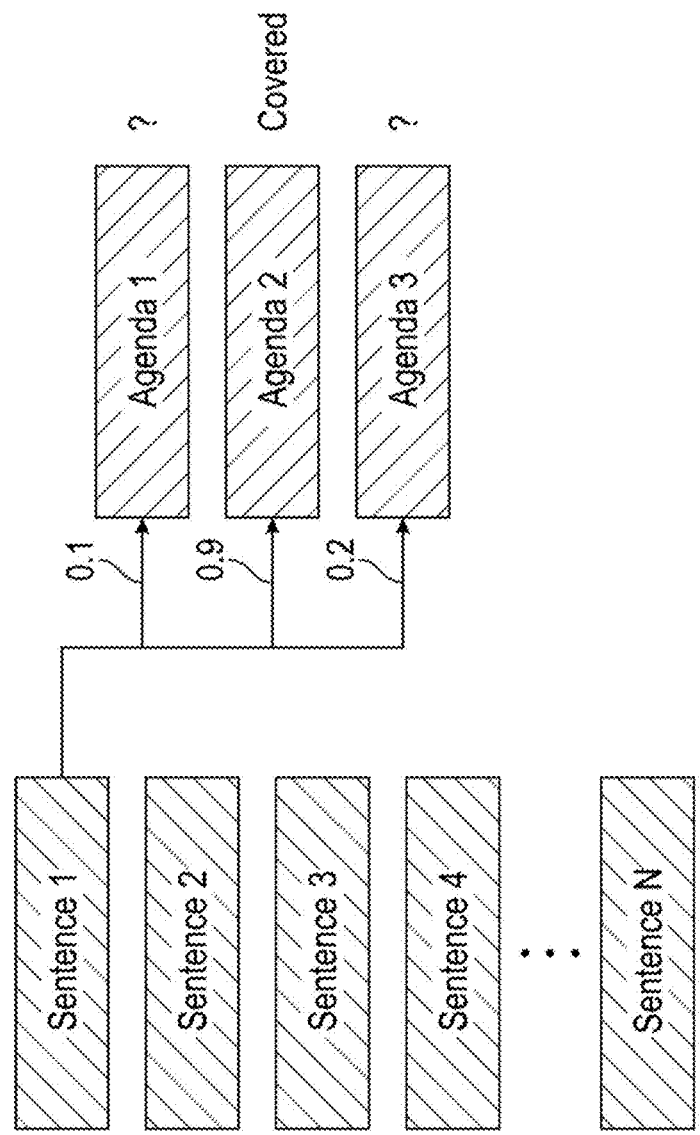
FIG. 6 is a diagram illustrating an exemplary prediction of agenda item coverage using a sentence similarity match, in accordance with some embodiments.

In some embodiments, the sentence similarity match techniques can include one or more of: (1) encoding, e.g., every utterance, or every two consecutive utterances, etc., as sentences using a sentence transformer; encoding the one or more agenda items; for each sentence, computing a similarity score with each agenda item; and classifying short agenda items as covered if the similarity score with a sentence is over a specified similarity threshold. An example of a sentence similarity match is illustrated in FIG. 6.

In some embodiments, the window similarity match techniques can include one or more of: applying a sliding window of a specified size to the utterances to store the computed similarity scores; and for each agenda item, if a specified number of the similarity scores are greater than a window threshold, classifying the agenda item as covered, where the window threshold is less than the sentence threshold.

In some embodiments, the word match techniques can include one or more of: splitting utterances into sentences (wherein an utterance may contain multiple sentences) and maintaining a sliding window of utterances; for sentences and agenda items, removing all words which are not nouns, proper nouns, verbs, adjectives, or adverbs; and for each agenda item, classifying the agenda item as covered if: it is not in a specified list of stop words, and if every word is in the sentences within the sliding window.

In some embodiments, the prediction methods for long items and short items, as described in steps 250 and 260 above, may be performed wholly or partially in an online fashion. In some embodiments, the prediction methods described in steps 250 and 260 may additionally or alternatively be performed wholly or partially in an offline fashion. In some embodiments, online prediction methods can include processing being performed via a remote server. In some embodiments, online processing can enable users to, e.g., confirm that they have covered everything they have planned for the meeting. In some embodiments, offline support can be used for, e.g., enabling users to highlight relevant parts of the utterances related to an agenda. This may be used for tasks such as, e.g., sales training.

At step 270, the system transmits, to one or more client devices, a status of the agenda items for the communication session. In some embodiments, prior to transmitting the status of the agenda items to the client devices, the system formats the status of the agenda items into a structured data markup format, such as, e.g., JSON format. In some embodiments, the system transmits a starting timestamp and ending timestamp for each section of the utterances determined to be a relevant topic or one or more utterances, or span (e.g., lines of the utterances) where the topic segment is located within the utterances.

In some embodiments, the status of the agenda items may be presented in the form of various applications, or additional data making use of the agenda items, utterances, topics, and/or any metadata may be used. In some embodiments, the system transmits an agenda item summary for an agenda item, with the agenda item summary including one or more utterances or topics related to or relevant to coverage of the agenda item. In some embodiments, the system transmits, to one or more client devices, one or more utterance results based on a search for some or all of the agenda item text within the communication session, or text determined to be similar within a similarity threshold to the agenda item. In some embodiments, the system transmits analytics data related to one or more agenda items and their coverage within the communication session.

In some embodiments, the transmitting of the status of the agenda items is performed in real time upon receiving the one or more agenda items and the utterances for the communication session. That is, upon receiving the agenda items and utterances as inputs during the meeting taking place, the system can be configured to output the status of the agenda items based on the predictions of agenda item coverage as the meeting proceeds. In some embodiments, new transcript content can be received during the course of the meeting, for example, as participants continue to speak and the transcript increases in content. As this new transcript content is received by the system, the system can perform steps 250 through 270 to predict whether long items have been covered and to predict whether short items have been covered, then transmit the updated agenda item status. Similarly, in some embodiments, new agenda items may be added during the course of the meeting. Once the agenda items have been added, the system can perform steps 240 through 270 to classify the agenda items, predict long item and short item status coverage, and transmit the updated agenda item status. Such steps can be performed in real time so there is no delay between the system receiving new input and updating the output of agenda item status.

In some embodiments, during the course of the meeting, the system can be configured such that one or more users connected to the communication session may modify one or more of the agenda items. The agenda items may be modified from, e.g., covered status to uncovered status, or from uncovered status to covered status. In some embodiments, one or more users may additionally or alternatively add agenda items and/or remove agenda items from the list of agenda items for the meeting. In some embodiments, agenda items which have been modified to covered status can be handled by the system such that they will not be included in the prediction steps for long items nor short items, i.e., steps 250 and 260.

Figure 3:
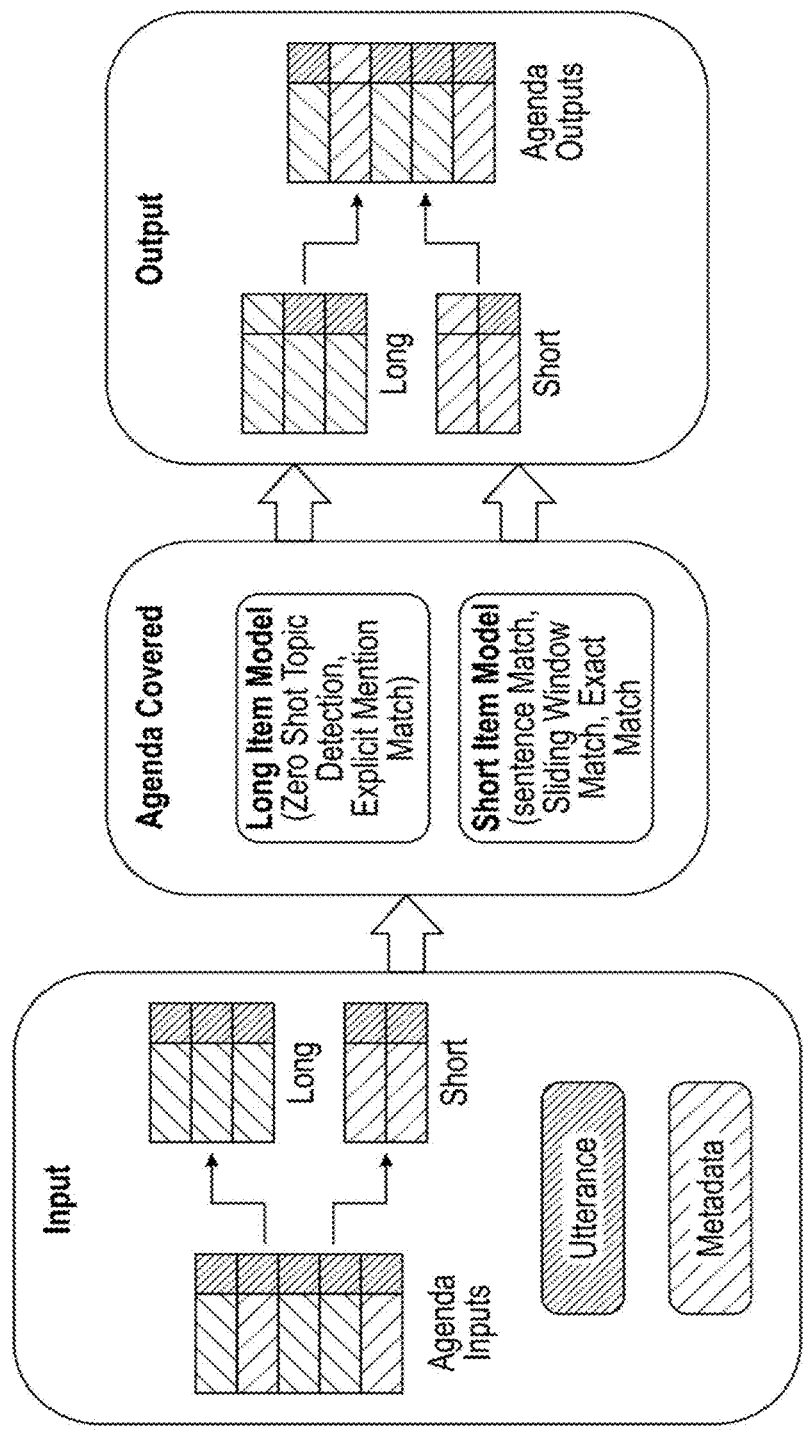
FIG. 3 is a diagram illustrating inputs and output for an exemplary method that may be performed in some embodiments.

FIG. 3 is a diagram illustrating inputs and output for an exemplary method that may be performed in some embodiments.

Within the "Input" section of the exemplary method, agenda inputs are received, and thereafter classified into either long agenda items or short agenda items. Additionally, utterances are received in the form of a transcript, and optionally, metadata about the communication session is received. Within the "Agenda Covered" section, these inputs are fed into a long item model for coverage prediction for the long agenda items, and a short item model for coverage prediction for the short agenda items. In some embodiments, the long item model may include one or more of zero shot topic detection and explicit mention match. In some embodiments, the short item model may include one or more of sentence match, sliding window match, and exact match. Within the "Output" section of the exemplary method, the output prediction of the long item model and the output prediction of the short item model are used to generate a status of the agenda items, which is transmitted to one or more client devices.

FIG. 4 is a diagram illustrating an exemplary agenda item classified as a long item and a corresponding section of a transcript, in accordance with some embodiments. The long agenda item text reads as "Happy crew leadership update". The section of the transcript which is shown in the illustration includes a long discussion which can be considered a leadership update on the company's "happy crew" team. The discussion necessary to deem the agenda item covered exceeds a specified sentence threshold of, e.g., five utterances, and thus the agenda item has been classified as a long item. A long item model is used to generate a prediction output that the long item has been covered during the communication session.

FIG. 5 is a diagram illustrating exemplary agenda items classified as short items and corresponding sentences within a transcript, in accordance with some embodiments. The exemplary agenda items read as "mention the number of preloaded questions" and "mention schedule a meeting with Jessica". The former is a single sentence match which can be deemed covered within a single utterance, as exemplified by the utterance "you can have up to 10 pre-loaded questions" in the transcript. The latter is a two sentence or window match which can be deemed covered within a sliding window of two utterances, as exemplified in the two utterances of "and like I said, I think that we should set up a meeting with her" and "her name is Jessica".

FIG. 6 is a diagram illustrating an exemplary prediction of agenda item coverage using a sentence similarity match, in accordance with some embodiments. First, the sentences 1 through N are encoded using a sentence transformer, and the agenda items are encoded as well. For each sentence, a similarity score is computed with each agenda item. In the example illustration, sentence 1 has a 0.1 similarity score computed with agenda 1, a 0.9 similarity score computed with agenda 2, and a 0.2 similarity score computed with agenda 3. An agenda item is marked as covered if the similarity score exceeds a specified threshold. In this case, 0.9 exceeds a specified threshold of 0.6, so agenda 2 is predicted to be covered. Neither 0.1 nor 0.2 exceeds the specified threshold of 0.6, so agenda 1 and agenda 3 are predicted to not be covered yet or otherwise have an unknown status.

Figure 7:
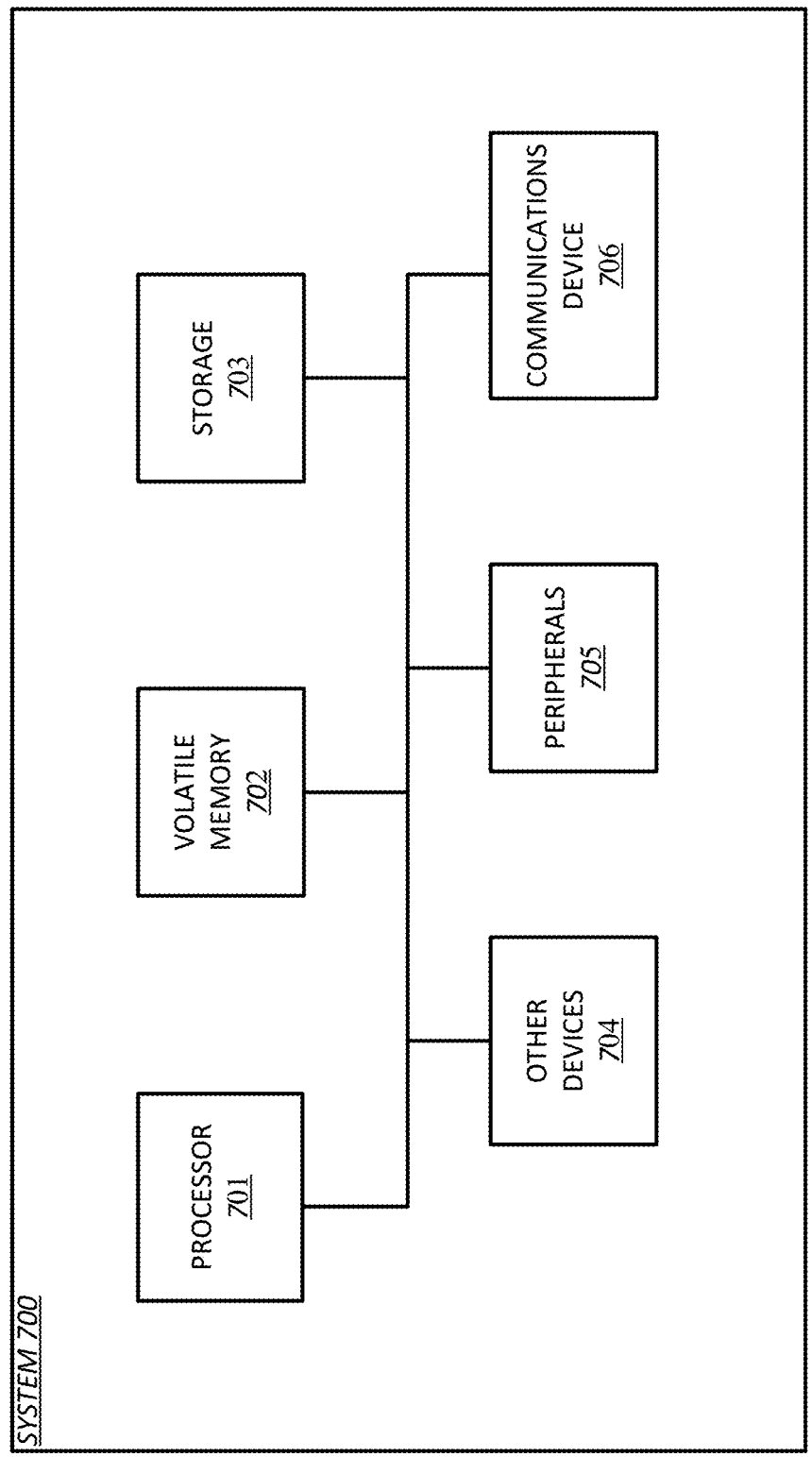
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium such as a bus, crossbar, or network.

An aspect includes a method that includes classifying agenda items of a communication session as long items or short items, wherein a short item is covered within a threshold. For each agenda item classified as a long item, the method includes extracting one or more topics from utterances via a sliding window method. The sliding window method may include shifting a window over the utterances one word at a time to generate two blocks of utterances per each shift of the window, at each shift of the window, comparing the two blocks of the utterances to determine whether the blocks are semantically similar, and defining a boundary between two topics when two blocks of utterances are semantically different. The method may include determining whether a topic related to each agenda item classified as a long item has been covered. For each agenda item classified as a short item, the method may include determining whether one or more of the utterances within the threshold cover each agenda item classified as a short item. The method may include transmitting, to one or more client devices, a status of the agenda items for the communication session.

An aspect includes a communication system that comprises one or more processors. The one or more processors may be configured to classify agenda items of a communication session as long items or short items, wherein a short item is covered within a threshold. For each agenda item classified as a long item, the one or more processors may be configured to extract one or more topics from utterances via a sliding window method. The sliding window method may include shifting a window over the utterances one word at a time to generate two blocks of utterances per each shift of the window, at each shift of the window, comparing the two blocks of the utterances to determine whether the blocks are semantically similar, and defining a boundary between two topics when two blocks of utterances are semantically different. The one or more processors may be configured to determine whether a topic related to each agenda item classified as a long item has been covered. For each agenda item classified as a short item, the one or more processors may be configured to determine whether one or more of the utterances within the threshold cover each agenda item classified as a short item. The one or more processors may be configured to transmit, to one or more client devices, a status of the agenda items for the communication session.

An aspect may include a non-transitory computer-readable medium containing instructions that when executed by a processor, cause the processor to perform operation. The operations may include classifying agenda items of a communication session as long items or short items, wherein a short item is covered within a threshold. For each agenda item classified as a long item, the operations may include extracting one or more topics from utterances via a sliding window method. The sliding window method may include shifting a window over the utterances one word at a time to generate two blocks of utterances per each shift of the window, at each shift of the window, comparing the two blocks of the utterances to determine whether the blocks are semantically similar, and defining a boundary between two topics when two blocks of utterances are semantically different. The operations may include determining whether a topic related to each agenda item classified as a long item has been covered. For each agenda item classified as a short item, the operations may include determining whether one or more of the utterances within the threshold cover each agenda item classified as a short item. The operations may include transmitting, to one or more client devices, a status of the agenda items for the communication session.

In one or more aspects, metadata for the communication session may be received and used for determining whether the agenda items have been covered. In one or more aspects, video output frames for the communication session may be received and used for determining whether the agenda items have been covered. In one or more aspects, the status of the agenda items for the communication session may be transmitted in real time upon determining that an agenda item of the agenda items has been covered. In one or more aspects, one or more users connected to the communication session may modify one or more of the agenda items to covered status or uncovered status. In one or more aspects, the agenda items that have been modified to covered status may not be included in the determination of status for other long items or short items. In one or more aspects, the determinations of status for long items and short items may be performed wither online or offline, where the online determinations may be performed via a remote server. In one or more aspects, a topic detection model may be used to determine whether the topic related to each agenda item classified as a long item has been covered, the topic detection model comprising one or more of zero shot topic detection techniques, and explicit mention match techniques. In one or more aspects, the topic detection model may include one or more real time interference techniques. In one or more aspects, an utterance of the utterances may include one or more sentences. In one or more aspects, one or more matching methods may be applied to determine whether one or more of the utterances within the threshold cover each agenda item classified as a short item, wherein the matching methods comprise one or more of: sentence similarity match techniques, window similarity match techniques, and word match techniques. In one or more aspects, the word match techniques may include splitting the utterances into a plurality of sentences or maintaining a sliding window of utterances. In one or more aspects, the sentence similarity match techniques may include encoding the utterances as sentences using a sentence transformer, encoding the one or more agenda items, for each sentence, computing a similarity score with each agenda item, and classifying agenda items covered when the similarity score with a sentence is over a specified similarity threshold. In one or more aspects, the window similarity match techniques may include applying a sliding window of a specified size to the utterances to store computed similarity scores, and, for each agenda item, when a specified number of the similarity scores are greater than a window threshold, classifying the agenda item as covered, where the window threshold is less than the sentence threshold. In one or more aspects, the word match techniques may include applying a sliding window of a specified size to the utterances to store all utterance texts as sentences, for sentences and agenda items, removing all words which are not nouns, proper nouns, verbs, adjectives, or adverbs, and for each agenda item, classifying the agenda item as covered when it is not in a specified list of stop words and every word is in the sentences within the sliding window.

It will be appreciated that the present disclosure may include any one and up to all of the following examples.

Example 1. A method, comprising: connecting to a communication session with a plurality of participants; receiving one or more agenda items for the communication session; receiving a plurality of utterances from participants produced during the communication session; classifying each agenda item as a long item or a short item, a short item being covered within a specified sentence threshold; for agenda items classified as long items: extracting one or more topics from the utterances, and using a topic detection model to predict whether a topic related to each agenda item classified as a long item has been covered; for agenda items classified as short items: applying one or more matching methods to predict whether one or more of the utterances within the sentence threshold cover each agenda item classified as a short item; and transmitting, to one or more client devices, a status of the agenda items for the communication session.

Example 2. The method of example 1, further comprising: receiving metadata for the communication session, the metadata being used for the prediction of the status of the agenda items.

Example 3. The method of any of examples 1-2, further comprising: receiving video output frames for the communication session, the video output frames being used for the prediction of the status of the agenda items.

Example 4. The method of any of examples 1-3, wherein transmitting the status of the agenda items for the communication session is performed in real time upon receiving the one or more agenda items and the utterances for the communication session.

Example 5. The method of any of examples 1-4, wherein one or more users connected to the communication session may modify one or more of the agenda items to covered status or uncovered status, and wherein agenda items which have been modified to covered status will not be included in the predictions for long items or short items.

Example 6. The method of any of examples 1-5, wherein predictions for long items and short items are performed either online or offline, and where online predictions comprise processing being performed via a remote server.

Example 7. The method of any of examples 1-6, wherein extracting the one or more topics from the utterances is performed via a sliding window method.

Example 8. The method of example 7, wherein the sliding window method comprises: shifting a window over the utterances one word at a time with a pre-specified window size to generate two blocks of utterances per each shift of the window; at each shift of the window, comparing the two blocks of the utterances to determine whether the blocks are semantically similar; and defining a boundary between two topics when two blocks of utterances are semantically different.

Example 9. The method of any of examples 1-8, wherein the topic detection model comprises one or more of: zero shot topic detection techniques, and explicit mention match techniques.

Example 10. The method of any of examples 1-9, wherein the topic detection model comprises one or more real time inference techniques.

Example 11. The method of any of examples 1-10, wherein the matching methods comprise one or more of: sentence similarity match techniques, window similarity match techniques, and word match techniques.

Example 12. The method of example 11, wherein the word match techniques comprise: splitting the utterances into a plurality of sentences; and maintaining a sliding window of utterances.

Example 13. The method of example 11, wherein the sentence similarity match techniques comprise: encoding the utterances as sentences using a sentence transformer; encoding the one or more agenda items; for each sentence, computing a similarity score with each agenda item; and classifying agenda items as covered if the similarity score with a sentence is over a specified similarity threshold.

Example 14. The method of example 11, wherein the window similarity match techniques comprise: applying a sliding window of a specified size to the utterances to store the computed similarity scores; and for each agenda item, if a specified number of the similarity scores are greater than a window threshold, classifying the agenda item as covered, where the window threshold is less than the sentence threshold.

Example 15. The method of example 11, wherein the word match techniques comprise: applying a sliding window of a specified size to the utterances to store all utterance texts as sentences; for sentences and agenda items, removing all words which are not nouns, proper nouns, verbs, adjectives, or adverbs; and for each agenda item, classifying the agenda item as covered if: it is not in a specified list of stop words, and every word is in the sentences within the sliding window.

Example 16. The method of any of examples 1-15, wherein an utterance is comprised of one or more sentences.

Example 17. A communication system comprising one or more processors configured to perform the operations of: connecting to a communication session with a plurality of participants; receiving one or more agenda items for the communication session; receiving a plurality of utterances from participants produced during the communication session; for each of the one or more agenda items, classifying the agenda item as a long item or a short item, a short item being covered within a specified sentence threshold; for agenda items classified as long items: extracting one or more topics from the utterances, and using a topic detection model to predict whether a topic related to each agenda item classified as a long item has been covered; for agenda items classified as short items: applying one or more matching methods to predict whether one or more of the utterances within the sentence threshold cover each agenda item classified as a short item; and transmitting, to one or more client devices, a status of the agenda items for the communication session.

Example 18. The communication system of example 17, wherein the one or more processors are further configured to perform the operation of: receiving metadata for the communication session, the metadata being used for the prediction of the status of the agenda items.

Example 19. The communication system of any of examples 17-18, wherein the one or more processors are further configured to perform the operation of: receiving video output frames for the communication session, the video output frames being used for the prediction of the status of the agenda items.

Example 20. The communication system of any of examples 17-19, wherein transmitting the status of the agenda items for the communication session is performed in real time upon receiving the one or more agenda items and the utterances for the communication session.

Example 21. The communication system of any of examples 17-20, wherein one or more users connected to the communication session may modify one or more of the agenda items to covered status or uncovered status, and wherein agenda items which have been modified to covered status will not be included in the predictions for long items or short items.

Example 22. The communication system of any of examples 17-21, wherein predictions for long items and short items are performed either online or offline, and where online predictions comprise processing being performed via a remote server.

Example 23. The communication system of any of examples 17-22, wherein extracting the one or more topics from the utterances is performed via a sliding window communication system.

Example 24. The communication system of example 23, wherein the sliding window communication system comprises: shifting a window over the utterances one word at a time with a pre-specified window size to generate two blocks of utterances per each shift of the window; at each shift of the window, comparing the two blocks of the utterances to determine whether the blocks are semantically similar; and defining a boundary between two topics when two blocks of utterances are semantically different.

Example 25. The communication system of any of examples 17-24, wherein the topic detection model comprises one or more of: zero shot topic detection techniques, and explicit mention match techniques.

Example 26. The communication system of any of examples 17-25, wherein the topic detection model comprises one or more real time inference techniques.

Example 27. The communication system of any of examples 17-26, wherein the matching communication systems comprise one or more of: sentence similarity match techniques, window similarity match techniques, and word match techniques.

Example 28. The communication system of example 27, wherein the word match techniques comprise: splitting the utterances into a plurality of sentences; and maintaining a sliding window of utterances.

Example 29. The communication system of example 27, wherein the sentence similarity match techniques comprise: encoding the utterances as sentences using a sentence transformer; encoding the one or more agenda items; for each sentence, computing a similarity score with each agenda item; and classifying agenda items as covered if the similarity score with a sentence is over a specified similarity threshold.

Example 30. The communication system of example 27, wherein the window similarity match techniques comprise: applying a sliding window of a specified size to the utterances to store the computed similarity scores; and for each agenda item, if a specified number of the similarity scores are greater than a window threshold, classifying the agenda item as covered, where the window threshold is less than the sentence threshold.

Example 31. The communication system of example 27, wherein the word match techniques comprise: applying a sliding window of a specified size to the utterances to store all utterance texts as sentences; for sentences and agenda items, removing all words which are not nouns, proper nouns, verbs, adjectives, or adverbs; and for each agenda item, classifying the agenda item as covered if: it is not in a specified list of stop words, and every word is in the sentences within the sliding window.

Example 32. The communication system of any of examples 17-31, wherein an utterance is comprised of one or more sentences.

Example 33. A non-transitory computer-readable medium containing instructions for generating a note with session content from a communication session, comprising: instructions for connecting to a communication session with a plurality of participants; instructions for receiving one or more agenda items for the communication session; receiving a plurality of utterances from participants produced during the communication session; for each of the one or more agenda items, instructions for classifying the agenda item as a long item or a short item, a short item being covered within a specified sentence threshold; for agenda items classified as long items: instructions for extracting one or more topics from the utterances, and instructions for using a topic detection model to predict whether a topic related to each agenda item classified as a long item has been covered; for agenda items classified as short items: instructions for applying one or more matching methods to predict whether one or more of the utterances within the sentence threshold cover each agenda item classified as a short item; and instructions for transmitting, to one or more client devices, a status of the agenda items for the communication session.

Example 34. The non-transitory computer readable medium of example 33, further comprising: receiving metadata for the communication session, the metadata being used for the prediction of the status of the agenda items.

Example 35. The non-transitory computer readable medium of any of examples 33-34, further comprising: receiving video output frames for the communication session, the video output frames being used for the prediction of the status of the agenda items.

Example 36. The non-transitory computer readable medium of any of examples 33-35, wherein transmitting the status of the agenda items for the communication session is performed in real time upon receiving the one or more agenda items and the utterances for the communication session.

Example 37. The non-transitory computer readable medium of any of examples 33-36, wherein one or more users connected to the communication session may modify one or more of the agenda items to covered status or uncovered status, and wherein agenda items which have been modified to covered status will not be included in the predictions for long items or short items.

Example 38. The non-transitory computer readable medium of any of examples 33-37, wherein predictions for long items and short items are performed either online or offline, and where online predictions comprise processing being performed via a remote server.

Example 39. The non-transitory computer readable medium of any of examples 33-38, wherein extracting the one or more topics from the utterances is performed via a sliding window non-transitory computer readable medium.

Example 40. The non-transitory computer readable medium of example 7, wherein the sliding window non-transitory computer readable medium comprises: shifting a window over the utterances one word at a time with a pre-specified window size to generate two blocks of utterances per each shift of the window; at each shift of the window, comparing the two blocks of the utterances to determine whether the blocks are semantically similar; and defining a boundary between two topics when two blocks of utterances are semantically different.

Example 41. The non-transitory computer readable medium of any of examples 33-40, wherein the topic detection model comprises one or more of: zero shot topic detection techniques, and explicit mention match techniques.

Example 42. The non-transitory computer readable medium of any of examples 33-41, wherein the topic detection model comprises one or more real time inference techniques.

Example 43. The non-transitory computer readable medium of any of examples 33-42, wherein the matching non-transitory computer readable mediums comprise one or more of: sentence similarity match techniques, window similarity match techniques, and word match techniques.

Example 44. The non-transitory computer readable medium of example 43, wherein the word match techniques comprise: splitting the utterances into a plurality of sentences; and maintaining a sliding window of utterances.

Example 45. The non-transitory computer readable medium of example 43, wherein the sentence similarity match techniques comprise: encoding the utterances as sentences using a sentence transformer; encoding the one or more agenda items; for each sentence, computing a similarity score with each agenda item; and classifying agenda items as covered if the similarity score with a sentence is over a specified similarity threshold.

Example 46. The non-transitory computer readable medium of example 43, wherein the window similarity match techniques comprise: applying a sliding window of a specified size to the utterances to store the computed similarity scores; and for each agenda item, if a specified number of the similarity scores are greater than a window threshold, classifying the agenda item as covered, where the window threshold is less than the sentence threshold.

Example 47. The non-transitory computer readable medium of example 43, wherein the word match techniques comprise: applying a sliding window of a specified size to the utterances to store all utterance texts as sentences; for sentences and agenda items, removing all words which are not nouns, proper nouns, verbs, adjectives, or adverbs; and for each agenda item, classifying the agenda item as covered if: it is not in a specified list of stop words, and every word is in the sentences within the sliding window.

Example 48. The non-transitory computer readable medium of any of examples 33-47, wherein an utterance is comprised of one or more sentences.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   classifying agenda items of a communication session as long items or short items, wherein a short item is covered within a threshold;
   for each agenda item classified as a long item:
     extracting one or more topics from utterances via a sliding window method, wherein the sliding window method comprises:
       shifting a window over the utterances one word at a time to generate two blocks of utterances per each shift of the window;
       at each shift of the window, comparing the two blocks of the utterances to determine whether the blocks are semantically similar; and
       defining a boundary between two topics when two blocks of utterances are semantically different, and
     determining whether a topic related to each agenda item classified as a long item has been covered;
   for each agenda item classified as a short item:
     determining whether one or more of the utterances within the threshold cover each agenda item classified as a short item; and
   transmitting, to one or more client devices, a status of the agenda items for the communication session.

2. The method of claim 1, further comprising:
   receiving metadata for the communication session, the metadata being used for determining whether the agenda items have been covered.

3. The method of claim 1, further comprising:
   receiving video output frames for the communication session, the video output frames being used for determining whether the agenda items have been covered.

4. The method of claim 1, wherein the status of the agenda items for the communication session is transmitted in real time upon determining that an agenda item of the agenda items has been covered.

5. The method of claim 1, wherein one or more users connected to the communication session modify one or more of the agenda items to covered status or uncovered status, and wherein agenda items that have been modified to covered status will not be included in the determinations of status for other long items or short items.

6. The method of claim 1, wherein determinations of status for long items and short items are performed either online or offline, and where online determinations comprise processing being performed via a remote server.

7. The method of claim 1, wherein a topic detection model is used to determine whether the topic related to each agenda item classified as a long item has been covered, the topic detection model comprising one or more of zero shot topic detection techniques, and explicit mention match techniques.

8. The method of claim 1, wherein a topic detection model is used to determine whether the topic related to each agenda item classified as a long item has been covered, the topic detection model comprising one or more real time inference techniques.

9. The method of claim 1, wherein an utterance of the utterances comprises one or more sentences.

10. The method of claim 1, further comprising:
    applying one or more matching methods to determine whether one or more of the utterances within the threshold cover each agenda item classified as a short item, wherein the matching methods comprise one or more of: sentence similarity match techniques, window similarity match techniques, and word match techniques.

11. The method of claim 10, wherein the word match techniques comprise:
    splitting the utterances into a plurality of sentences; and
    maintaining a sliding window of utterances.

12. The method of claim 10, wherein the sentence similarity match techniques comprise:
    encoding the utterances as sentences using a sentence transformer;
    encoding the one or more agenda items;
    for each sentence, computing a similarity score with each agenda item; and
    classifying agenda items as covered if the similarity score with a sentence is over a specified similarity threshold.

13. The method of claim 10, wherein the window similarity match techniques comprise:
    applying a sliding window of a specified size to the utterances to store computed similarity scores; and
    for each agenda item, if a specified number of the similarity scores are greater than a window threshold, classifying the agenda item as covered, where the window threshold is less than the sentence threshold.

14. The method of claim 10, wherein the word match techniques comprise:
    applying a sliding window of a specified size to the utterances to store all utterance texts as sentences;
    for sentences and agenda items, removing all words which are not nouns, proper nouns, verbs, adjectives, or adverbs; and
    for each agenda item, classifying the agenda item as covered when:
      it is not in a specified list of stop words, and
      every word is in the sentences within the sliding window.

15. A communication system comprising:
    one or more processors configured to:
      classify agenda items of a communication session as long items or short items, wherein a short item is covered within a threshold;
      for each agenda item classified as a long item:
        extract one or more topics from utterances via a sliding window method, wherein the sliding window method, wherein the one or more processors are configured to:
          shift a window over the utterances one word at a time to generate two blocks of utterances per each shift of the window;
          at each shift of the window, compare the two blocks of the utterances to determine whether the blocks are semantically similar; and
          define a boundary between two topics when two blocks of utterances are semantically different, and
        determine whether a topic related to each agenda item classified as a long item has been covered;
      for each agenda item classified as a short item:
        determine whether one or more of the utterances within the threshold cover each agenda item classified as a short item; and
      transmit, to one or more client devices, a status of the agenda items for the communication session.

16. The communication system of claim 15, wherein the one or more topics from the utterances is performed via the sliding window method.

17. The communication system of claim 15, wherein the one or more processors are configured to use a topic detection model that comprises one or more of: zero shot topic detection techniques, and explicit mention match techniques.

18. A non-transitory computer-readable medium containing instructions that when executed by a processor, cause the processor to perform operations comprising:
   classifying agenda items as long items or short items, wherein a short item is covered within a threshold;
   for each agenda item classified as a long item:
      extracting one or more topics from utterances via a sliding window method, wherein the sliding window method comprises:
         shifting a window over the utterances one word at a time with a to generate two blocks of utterances per each shift of the window;
         at each shift of the window, comparing the two blocks of the utterances to determine whether the blocks are semantically similar; and
         defining a boundary between two topics when two blocks of utterances are semantically different, and
      determining whether a topic related to each agenda item classified as a long item has been covered;
   for each agenda item classified as a short item:
      determining whether one or more of the utterances within the threshold cover each agenda item classified as a short item; and
   transmitting, to one or more client devices, a status of the agenda items for communication session.

19. The non-transitory computer-readable medium of claim 18, wherein the operations further comprise:
   receiving metadata for the communication session, the metadata being used for determining whether the agenda items have been covered.

20. The non-transitory computer-readable medium of claim 18, wherein the operations further comprise:
   receiving video output frames for the communication session, the video output frames being used for determining whether the agenda items have been covered.

* * * * *